United States Patent
Aixala et al.

(10) Patent No.: US 11,123,795 B2
(45) Date of Patent: Sep. 21, 2021

(54) PARTICLE FOR MAKING METAL PARTS USING 3D PRINTING AND METHOD FOR MAKING METAL PARTS

(71) Applicant: COMMISSARIAT À L'ÉNERGIE ATOMIQUE ET AUX ÉNERGIES ALTERNATIVES, Paris (FR)

(72) Inventors: Luc Aixala, Saint-Egreve (FR); Olivier Dellea, La Talaudiere (FR); Gilles Gaillard, Meylan (FR); Olivier Poncelet, Grenoble (FR); Nicolas Tissot, Grenoble (FR)

(73) Assignee: COMMISSARIAT À L'ÉNERGIE ATOMIQUE ET AUX ÉNERGIES ALTERNATIVES, Paris (FR)

(*) Notice: Subject to any disclaimer, the term of this patent is extended or adjusted under 35 U.S.C. 154(b) by 243 days.

(21) Appl. No.: 15/991,625

(22) Filed: May 29, 2018

(65) Prior Publication Data
US 2018/0339335 A1    Nov. 29, 2018

(30) Foreign Application Priority Data
May 29, 2017    (FR) ................................. 17 54702

(51) Int. Cl.
*B22F 1/00* (2006.01)
*B22F 1/02* (2006.01)
(Continued)

(52) U.S. Cl.
CPC .............. *B22F 1/0044* (2013.01); *B01J 13/02* (2013.01); *B01J 13/04* (2013.01); *B01J 13/22* (2013.01); *B22F 1/0048* (2013.01); *B22F 1/02* (2013.01); *B22F 9/24* (2013.01); *B22F 10/20* (2021.01); *B32B 15/02* (2013.01); *B33Y 70/00* (2014.12);
(Continued)

(58) Field of Classification Search
CPC .. B01J 13/02; B01J 13/04; B01J 13/22; B22F 1/0044; B22F 1/0048; B22F 1/02; B22F 2301/052; B22F 2301/10; B22F 2304/054; B22F 3/1055; B22F 9/24; B32B 15/02; B33Y 10/00; B33Y 70/00; Y02P 10/25
See application file for complete search history.

(56) References Cited

U.S. PATENT DOCUMENTS

2013/0277891 A1    10/2013 Teulet
2016/0101432 A1    4/2016 Dellea et al.
(Continued)

FOREIGN PATENT DOCUMENTS

| | | |
|---|---|---|
| FR | 2980380 A1 | 3/2013 |
| WO | 2015054493 A1 | 4/2015 |
| WO | 2017051123 A1 | 3/2017 |

OTHER PUBLICATIONS

Selective laser melting additive manufacturing of TiC/AlSi10Mg bulk form nanocomposites with tailored microstructures and properties Dongdong Gu, Hongqiao Wanga, Fei Changa,, Donghua Daia,, Pengpeng Yuana, Yves-Christian Hagedorn (Year: 2014).*

(Continued)

*Primary Examiner* — Jenny R Wu
(74) *Attorney, Agent, or Firm* — Pearne & Gordon LLP (57) ABSTRACT

Particle (1) which comprises a core (2) made of copper, of a copper alloy, of aluminium or of an aluminium alloy, covered with an external layer (3), where the external layer (3) is formed from metal nanoparticles or carbon nanotubes.

21 Claims, 3 Drawing Sheets

(51) Int. Cl.
    *B22F 9/24*     (2006.01)
    *B01J 13/02*     (2006.01)
    *B01J 13/22*     (2006.01)
    *B32B 15/02*     (2006.01)
    *B01J 13/04*     (2006.01)
    *B22F 10/20*     (2021.01)
    *B33Y 70/00*     (2020.01)
    *B33Y 10/00*     (2015.01)

(52) U.S. Cl.
    CPC ..... *B22F 2301/052* (2013.01); *B22F 2301/10* (2013.01); *B22F 2304/054* (2013.01); *B33Y 10/00* (2014.12)

(56) References Cited

U.S. PATENT DOCUMENTS

| | | | |
|---|---|---|---|
| 2016/0214319 A1 | 7/2016 | Wiel et al. | |
| 2016/0250612 A1* | 9/2016 | Oldenburg | B01J 13/20 428/404 |
| 2016/0279666 A1 | 9/2016 | Dellea et al. | |
| 2016/0298215 A1* | 10/2016 | Yang | C22C 13/00 |
| 2016/0339517 A1* | 11/2016 | Joshi | B22F 3/1055 |
| 2017/0028468 A1 | 2/2017 | Dellea et al. | |
| 2017/0291222 A1* | 10/2017 | Khatiwada | E21B 33/12 |
| 2018/0001340 A1 | 1/2018 | Dellea | |
| 2018/0045711 A1 | 2/2018 | Roupioz et al. | |
| 2018/0133789 A1* | 5/2018 | Martin | B22F 1/025 |
| 2018/0214991 A1* | 8/2018 | Yahata | B22F 1/02 |
| 2019/0032175 A1* | 1/2019 | Martin | C22C 1/10 |

OTHER PUBLICATIONS

Preliminary French Search Report for FR 1754702 dated Feb. 19, 2018.

Vora, P. et al. "AlSi12 in-situ alloy formation and residual stress reduction using anchorless selective laser melting" In: Additive Manufacturing, 2015, vol. 7, pp. 12-19.

Bartkowiak, K. et al. "New developments of laser processing aluminium alloys via additive manufacturing technique" In: Physics Procedia, 2011, vol. 12, pp. 393-401.

U.S. Appl. No. 15/831,583 entitled "Methods for Manufacturing Coated Metal Nanoparticles and a Composite Material Comprising Same, Use of Such a Material and Device Comprising Same", filed Dec. 5, 2017.

* cited by examiner

PARTICLE FOR MAKING METAL PARTS USING 3D PRINTING AND METHOD FOR MAKING METAL PARTS

CROSS-REFERENCE TO RELATED APPLICATIONS

This application claims priority from French Patent Application No. 17 54702 filed on May 29, 2017. The content of this application is incorporated herein by reference in its entirety.

TECHNICAL FIELD AND STATE OF THE PRIOR ART

The field of the present invention relates to the manufacture of metal parts by 3D printing, for example for the automotive sector, the medical sector or for the aerospace sector.

More specifically, the present invention relates to metal particles used for 3D printing and to a method for making metal parts by 3D printing using such particles.

3D printing, also called additive manufacturing, involves forming a metal component by creating a stack of several layers successively deposited one upon the other until the final form of the part is obtained. Each layer is melted, and then solidified on the subjacent layer so as to ensure the cohesion of the stack.

Thus it is possible to produce parts industrially, with simple or complex shapes, which have satisfactory mechanical properties.

The creation of aluminium or aluminium alloy parts is of great industrial interest, in particular in the field of aerospace.

The aluminium alloys widely used in 3D printing are AlSi10Mg or AlSi12, since their melting and solidification temperatures are close, thus facilitating their manufacture. It is also possible to form aluminium alloys of high mechanical strength, for example those of the 2xxx series, by mixing, for example, aluminium powder with copper powder, as described in the article by Bartkowiak et al. ("New Developments of Laser Processing Aluminium Alloys via Additive Manufacturing Technique", Physics Procedia 12 (2011) 393-401). The mixture of powders is deposited on a substrate, and melted using laser radiation to form, after melting, an alloy of the AlCu type.

There is also interest in making parts by means of 3D printing out of pure copper, for example for electronic applications, where this method could be used to make cooling channels in the current conductors of batteries, improving their performance.

In bulk form, however, aluminium, aluminium alloys and copper exhibit a high degree of reflectivity (over 60% of the beam is reflected, or even 90% of the beam is reflected in the case of pure copper at ambient temperature). These materials moreover conduct heat very well, which also poses a problem in carrying out melting using lasers. The method for making parts from particles made of aluminium and/or of copper therefore requires high power lasers or relatively long irradiation times, or even heated printing plates, which complicates industrialisation of the method.

DESCRIPTION OF THE INVENTION

One aim of the present invention is consequently to propose metal particles which can be used in 3D laser printing technologies and which effectively absorb the laser beam.

Another aim of the present invention is to propose a method for the manufacture of metal parts that is easy to implement and which does not require a laser power which is too high or irradiation time which is too long, in order to be capable of industrialisation.

These aims are achieved with a particle which comprises a core made of copper, of a copper alloy, of aluminium or of an aluminium alloy, covered with an external layer, where the external layer is formed from metal nanoparticles or carbon nanotubes.

The term nanoparticles refers to elements or objects of elongated, round, spherical or polyhedric (for example a cube) form, and whose longest dimension is less than 500 nm, and preferably less than 100 nm. For example, the longest dimension ranges from 1 to 500 nm and preferably from 2 to 100 nm, and yet more preferably from 10 to 100 nm. The nanoparticles are, for example, nanowires, nanotubes, nanospheres or nanocubes.

The nanoparticles are advantageously made of copper. This material is inexpensive and easy to deposit.

According to one alternative, the external layer may be made of silicon.

The particles according to the invention allow improved laser-particle interaction, due to the external layer of the particle which has a nanostructure character, and which favours the absorption of the laser beam whilst reducing reflection. The structure confers a relief (humps, hollows, high degree of roughness) to the surface of the particle and enables better absorption of the laser beam (at least 100% improvement) when compared with a particle with a smooth surface. The structuring may cause regular or irregular organisation of the surface. In the case of an external layer of nanoparticles, this is a mono-particulate layer (a single thickness of nanoparticles) or a layer formed of several thicknesses of nanoparticles, which is continuous or discontinuous.

During the method for manufacturing the metal part by 3D printing, the particle is used in the form of a powder. The powder will melt under 3D irradiation and form either an aluminium alloy, for example of the Al—Cu type (series Al 2xxx), or pure copper (in the case of a copper particle core).

The term pure copper means that there is at least 95% by mass of copper, preferably at least 98% and yet more preferably at least 99%.

Depending on the laser power, the carbon nanotubes will either be sublimated or integrated into the composition of the alloy or into the copper, for example as impurities.

The quality of the materials obtained is improved in comparison to the prior art since all the particles have the same composition, the same surface texture and preferably the same particle size distribution. They will therefore melt in a manner which is much more homogeneous than particles of the prior art which do not have the same composition and/or the same particle size distribution. In effect, for example, in the case of the use of a mixture of powders, the smallest particles may be sublimated by the effect of the laser beam, if the laser is of high power. If the laser does not have very high power, only the smallest particles may melt. In both cases the alloy obtained is not that which is desired. The particles of the invention avoid these drawbacks.

The component elements of the alloy are within the same particle and not in several particles. With the particles of the invention, there is no need to mix different powders, and this limits the risks associated with the handling of the powders and the stratification problems associated with powder mixtures.

The nanoparticles advantageously have a diameter which ranges from 1 nm to 500 nm, and preferably from 100 nm to 300 nm.

Advantageously the particle core has a diameter ranging from 1 µm to 150 µm.

Advantageously a stack of one or more metal layers is arranged between the external layer and the particle core.

The term metallic means a metal, a non-metal such as silicon or a metal alloy. This is preferably a metal or silicon.

The metallic layer or layers may be continuous or discontinuous.

The external layer, either alone, or in combination with the stack, when there is one, forms the shell of the particle.

The composition of the final alloy, which makes up the molten particle, corresponds to the mixture of core materials and of the shell. With such particles, it is possible to obtain many "bespoke" variations of alloys after melting.

The metallic layer or layers each advantageously have a thickness which ranges from 1 nm to 500 nm, preferably from 5 nm to 300 nm and yet more preferably from 10 nm to 100 nm. Those skilled in the art will select the thickness of each layer depending on the composition of the final alloy. Such thicknesses can be achieved using conventional deposition techniques, such as physical vapour phase deposition.

Advantageously, the metallic layer or layers are each made of one metal chosen, independently, from gold, platinum, silver, manganese, magnesium, zirconium, zinc, silicon, nickel or copper. Those skilled in the art will select the metals depending on the composition of the final alloy. In general two successive layers of the stack will not have the same composition. Each layer in the stack will preferably have a different composition from the other layers of the stack.

Advantageously the stack comprises at least one continuous layer completely covering the core of the particle, where the continuous layer is preferably that in contact with the external layer. The core made of aluminium or of aluminium alloy is protected from oxidation. There is preferably no oxide layer on the surface of the aluminium or aluminium alloy, which improves the quality of the final alloy. According to one alternative, a thin layer of native oxide may be present at the surface of the aluminium. Since such an oxide layer is relatively thin, it does not prevent melting of the core of the particle.

Advantageously the continuous layer is made of a material which is less reductive than the core of the particle.

The term less reductive means that the material is less sensitive to air (water vapour and diatomic oxygen) than the material of the core of the particle, in order to protect it from oxidation phenomena. In other words, the material is less easily oxidised than the material forming the core of the particle. Little or no oxide is formed on the surface of the particle. The presence of oxide at the surface of the particle may, during laser melting, interfere with the propagation of the thermal flow and result in residual porosity and/or the presence of inclusions in the final material if all the particles are not melted, for example. The particles may possibly be reactive towards air or water, which may lead to a self-heating effect which could result in their igniting. These drawbacks are avoided or limited with the particle of the invention.

For example, for a core of aluminium or of aluminium alloy, then copper, tin, nickel, chromium or manganese will be chosen to form the less reductive continuous layer.

Copper is preferably chosen. This metal is less reductive than aluminium, and the techniques for deposition of copper are well understood, inexpensive and capable of undergoing industrialisation. A copper layer results in better adsorption of the copper nanoparticles at its surface compared with a layer made of another metal.

Advantageously the continuous layer is made of a material which has a lower reflectivity than that of the core material of the particle. For example, for an aluminium core, the material is zirconium, zinc, silicon or nickel. One of these materials, positioned at the exterior of the particle, in addition to forming a part of the composition of the final alloy and possibly being less reductive than aluminium, allows the reflectivity of the particles to be reduced even further, and further improves the absorption of the laser beam, for example. The energy input required for melting of the particle is reduced, there is less energy lost.

A layer of copper or of nickel also allows the pyrophoric nature of the core of particle made of aluminium to be reduced.

In the methods of the prior art, which use powders of different compositions to create an alloy, it is difficult to form particles of, for example, manganese or of magnesium, which are elements which are readily oxidised. The choice of aluminium alloys is therefore limited. With the method of the invention, it is possible to make a stack comprising a layer of manganese and/or of magnesium, arranged beneath the continuous layer of the stack, so as to be protected from oxidation.

Advantageously the particle is spherical and has a diameter ranging from 1 µm to 150 µm. For example, diameters from 1 µm to 50 µm can be chosen for deposition using laser melting (SLM). For example, diameters from 50 µm to 150 µm can be chosen for deposition using spraying of material (FDM), by melting using electron beams (EBM) and by laser metal deposition (LMD).

Preference is given to spherical particles in order to promote good spreading of the particles during the formation of the layer of particles (also called the powder layer or bed), in particular in manufacturing methods using SLM and EBM. Indeed, powders which are not very spherical and which are too small (poor pourability) cannot be used to make a homogeneous bed, which results in local deficiencies of material, leading to the formation of porosity in the finished part, which is highly prejudicial to quality (mechanical properties in particular).

This aim is also achieved by a process for manufacturing a metallic part by 3D printing which comprises, according to a first embodiment of the method of the invention, at least the following successive steps:

a1) Supply of a powder comprising particles such as previously defined, b1) Formation of a bed of powder on a substrate, c1) Localised melting of the powder bed so as to form a first molten zone, and solidification of the first molten zone of particles so as to form a first solidified zone.

Advantageously the steps b1) and c1) are repeated at least once so as to form at least one other solidified zone on the first solidified zone. The repetition of these steps leads to the formation of an object in three dimensions, layer by layer.

The melting of the layer of particles is advantageously achieved using selective laser melting.

This aim is also achieved by a process for manufacturing a metallic part by 3D printing which comprises, according to a second embodiment of the method of the invention, at least the following successive steps:

a2) Supply of a powder comprising particles such as previously defined, b2) Projection of the powder onto a substrate, where the powder passes through a laser beam before reaching the substrate, so that it is melted, c2) Solidification of the molten powder on the substrate so as to create a first solidified zone.

Advantageously the steps b2) and c2) are repeated at least once so as to form at least one other solidified zone on the first solidified zone.

Advantageously, in both these embodiments of the method of the invention, the core of the particles is made of aluminium, with the core being covered by a stack comprising a layer made of manganese, a layer made of magnesium and a layer made of copper and by an external layer of copper nanoparticles, and the solidified layer is a 2024 aluminium alloy.

Advantageously, in both these embodiments of the method of the invention, the core of the particles is made of 6060 aluminium, with the core being covered by a stack comprising a layer made of magnesium and a layer made of copper and by an external layer of copper nanoparticles, and the solidified layer is a 6061 aluminium alloy.

Advantageously, in both these embodiments of the method of the invention, the core of the particles is made of aluminium 2117, with the core being covered by a stack comprising a layer made of manganese, a layer made of magnesium and a layer made of copper and by an external layer of copper nanoparticles, and the solidified layer is a 2024 aluminium alloy.

BRIEF DESCRIPTION OF THE DRAWINGS

The present invention will be better understood on the basis of the description which follows and the appended drawings, in which.

In order to make the figures more readable, the various parts shown in the figures are not necessarily shown at a uniform scale.

The various possibilities (alternative variants and embodiments) must be understood as not being mutually exclusive, and as being capable of being combined with one another.

DETAILED DESCRIPTION OF PARTICULAR EMBODIMENTS

Reference is made first of all to FIGS. 1 to 4 which show a metallic particle 1 according to different specific embodiments.

Particle 1 has a core/shell structure. The core 2 of particle 1 is metallic. It is made for example of copper, of copper alloy, of aluminium or of aluminium alloy. In general the core 2 of the particle 1 is of microscopic size (less than 500 µm).

The copper alloy is, for example, a so-called thermal alloy of the type CuCrZr or CuNi.

The core 2 has, for example, a diameter ranging from 1 µm to 150 µm. A core will be chosen for example, which has a diameter of from 1 µm to 10 µm, from 20 µm to 40 µm or from 40 µm to 120 µm, depending on the objectives and the methods for manufacturing the metallic parts.

As shown in FIGS. 1 to 4, the particle comprises at least one external layer 3, which is structured and which covers the particle core. The external layer may be made of metal. The external layer 3 is made, for example, of copper or of silicon. It may also be formed of carbon nanotubes.

The structuring allows the optical absorption to be increased by creating surface relief on the particle. For example, it may be a layer which has humps and hollows, filaments, holes etc. The structuring can be chosen according to the wavelength of the laser in order to maximise optical absorption. The external layer 3 is formed of elements of nanometric size. For example, the external layer 3 may be formed of nanotubes (FIG. 1), of nanospheres (FIGS. 2 and 3), of nanowires (FIG. 4) or of nanocubes (not shown).

The nanoparticles have a diameter which ranges from 1 nm to 500 nm, for example from 1 nm to 60 nm. They preferably have a diameter which ranges from 100 nm to 300 nm.

The external layer is preferably formed from copper nanoparticles.

The particles are advantageously monodisperse. They advantageously have a homogeneous size. The nanoparticles form, for example, a mono-particulate layer, that is a layer which has a single thickness of nanoparticles. They can also form a layer which has several thicknesses of nanoparticles. In general, the layer of nanoparticles has a thickness which ranges from a few nanometres (for example 2 nm) to several micrometres (for example 5 µm). For example the thickness of the layer ranges from 100 nm to 5 µm, and preferably from 100 nm to 500 nm.

Figure 1:
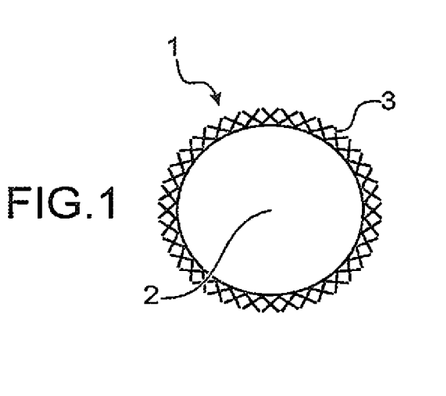
FIG. 1 is a diagrammatic representation of a particle, viewed in section, according to a first embodiment of the invention.
Figure 2:
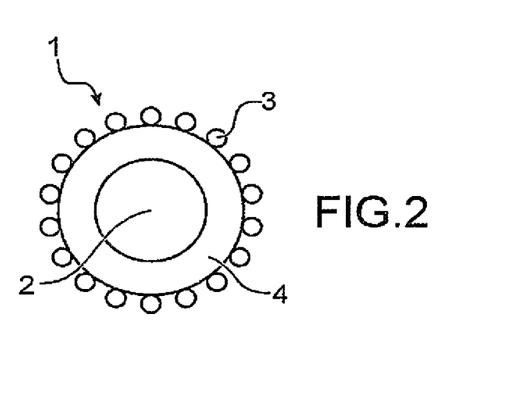
FIG. 2 is a schematic representation of a particle, viewed in section, according to a second embodiment of the invention.
Figure 3:
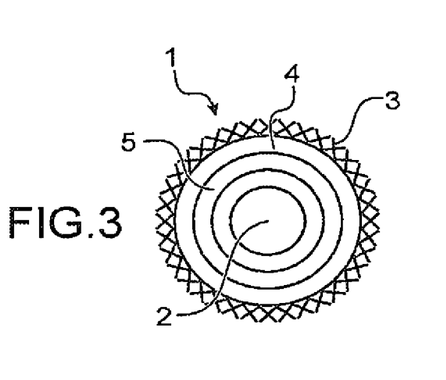
FIG. 3 is a schematic representation of a particle, viewed in section, according to a third embodiment of the invention.
Figure 4:
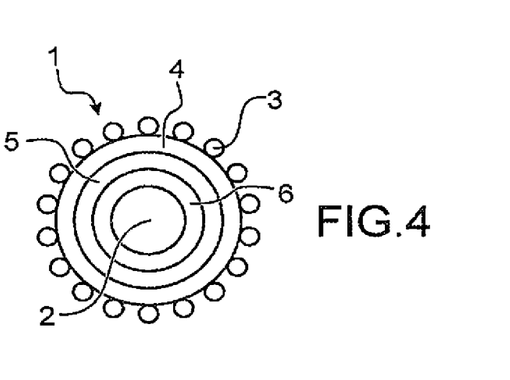
FIG. 4 is a schematic representation of a particle, viewed in section, according to a fourth embodiment of the invention.

As shown in FIGS. 2 to 4 the particle 1 may comprise, moreover, a stack of one or more (two, three etc.) metallic layers 4, 5, 6 arranged between the external layer 3 and the core 2.

The incorporation of this stack means that chemical elements can be added as desired to the particle which will, when the particle is molten, make up the final alloy.

The metallic layers 4, 5, 6 of the stack each have a thickness ranging from 5 nm to 250 nm, and preferably from 10 nm to 100 nm. The thickness of each of the layers can be selected independently of each other. Each layer advantageously exhibits a uniform thickness, that is, the thickness of each layer is substantially identical at all points on the particle.

The metallic layer or layers 4, 5, 6 are each made of a metal, preferably different from the other layers of the stack. The metal is, for example, chosen from gold, platinum, silver, manganese, magnesium, zirconium, zinc, silicon, nickel or copper.

The various component elements of the particle, that is, the core and shell materials (external layer 3+layer(s) 4, 5, 6 of the stack) advantageously have close melting points in order to favour homogeneous melting of the particle. The various elements have, for example, melting points which do not vary by more than 1000° C., and preferably not more than 500° C.

When the particles are heated, during the laser scanning for example, they heat up at the surface and the heat is transmitted by conduction to the interior of the particle. The presence of eutectic phases means that the molten pool can be formed at lower temperatures.

The stack preferably comprises at least one continuous layer completely covering the core 2 of the particle 1, where the continuous layer is preferably that in contact with the external layer 3 (layer 4 in FIGS. 1 to 4). More preferably yet, all the layers of the stack are continuous in order to completely cover the core 2 of the particle 1 or the subjacent layer.

According to a first embodiment, the continuous layer is made of a material which is less reductive than the material forming the core 2 of the particle 1. The material is preferably chosen from copper, lead, tin, nickel, cadmium, zirconium, chromium and zinc. It is preferably copper which exhibits a low reductive power whilst being inexpensive.

According to one alternative, the continuous layer 4, 5, 6 is made of a material which has a lower reflectivity than that of the materials of the core 2 of the particle 1. This is for example nickel.

According to one embodiment, the external layer 3 and the layer 4 of the stack which is in contact with the external layer 3 may be made of copper. The layer 4 is preferably continuous. The stack may only comprise the layer 4 as shown in FIG. 2.

According to one alternative, shown in FIG. 3, the stack may comprise other layers 5, 6 which are preferably continuous, in addition to the layer 4. By way of an example, the stack may comprise, from the core 2 towards the external layer 3: a layer 6 made of manganese and a layer 5 made of magnesium. The stack may comprise, in addition to the layer 4, a single other layer 5, for example made of magnesium.

The stack of layers preferably has a thickness of less than 5 μm, and preferably less than 1 μm. The stack of layers and the external layer 3 preferably have a total thickness of less than 1 μm.

In the case of a core made of aluminium or of an aluminium alloy, the particle 1 (core+stack+external layer) comprises at least 50% by mass of aluminium.

The particle 1 (core+external layer+any stack) is preferably spherical. It has a diameter ranging from 1 μm to 150 μm.

Such particles 1 maybe made using any suitable technique chosen by those skilled in the art. For example, the core 2 of the particle may be made by atomisation.

In the field of powder coating, a number of techniques exist which can be used to deposit one or more layers of materials on the surface on particles, for example by dry path, by wet path or by mechanical effect.

The dry path and wet path techniques involve placing the particles in suspension such that their surface is accessible to the treatments. This suspension is achieved either by dispersion of the particles in a liquid for wet path methods, or by the use of a gas flow as a fluidising agent for dry path methods.

By way of an example of dry path deposition, it is possible to deposit silicon on particles using fluidised-bed chemical vapour deposition (or FB-CVD) from silane which is decomposed into molecular hydrogen and into silicon.

The particles can also be functionalised by a layer of interest by physical vapour deposition (or PVD).

Wet path deposition techniques encompass chemical or electrochemical techniques. The most widely used methods are electrolysis, chemical immersion (displacement, reduction) and conversions.

Deposition can also be achieved by heterogeneous phase precipitation or by impregnation and decomposition of organometallics in a solvated phase.

Figure 5:
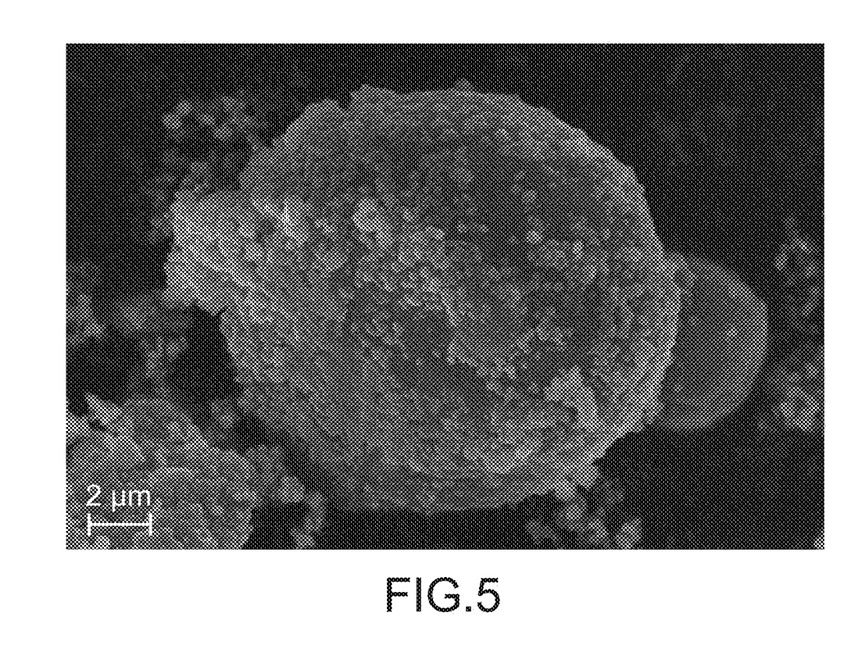
FIG. 5 shows a scanning electron microscope image of particles whose external layer is formed of copper nanoparticles.

FIG. 5 shows a particle made in this manner. The core is made of aluminium alloy AlSi12 and the external non-continuous layer is formed from copper nanoparticles. The diameter of the particles is about 30 μm. The diameter of the nanoparticles at the surface of the particles is about 200 nm to 300 nm. The nanoparticles have been made by chemical deposition (reduction, oxidation-reduction).

The method for manufacturing of metal parts by 3D printing using a particle powder as defined earlier will now be described. The method at least implements one step in which the particles are melted. In practice a substrate is successively covered by several layers which are locally melted then solidified until the final form of the desired part is obtained.

According to a first embodiment the method includes the following successive steps:

a1) Supply of a powder comprising particles 1 as defined earlier, b1) Formation of a layer of particles 1 (also known as a powder bed) on a substrate, c1) Localised melting of the powder bed so as to form a first molten zone, and solidification of the first molten zone of particles 1 so as to form a first solidified zone.

The melting step is used to melt the particles 1 locally and create molten patterns in the powder bed. One or more zones of molten particles may be made in order to form the desired pattern. The particles forming the pattern advantageously melt completely so as to result, on solidification, in one or more solidified zones made either of copper or of an alloy in which all the elements are homogeneously distributed.

Steps b1) and c1) can be repeated at least once so as to form at least one other solidified zone on the first solidified zone.

The substrate (also known as the plate) can move vertically downwards (along an axis Z perpendicular to the powder bed). At the start of the method the powder is spread on the plate and a first solidified zone is formed. For the formation of the 3D pattern, powder is subsequently spread each time on the previously solidified zone.

Melting of the particles 1 is advantageously achieved using a laser beam or an electron beam which locally sweeps the surface of each layer of powder in order to melt it, according to a specific pattern. After passage of the beam the layer solidifies. Another layer of particles is once more deposited on the previously solidified layer and is then melted and solidified in an identical manner. The method is repeated until the final form of the part is obtained. Non-solidified powder is then removed and the final part is detached from the substrate.

The techniques used may be electron beam melting (EBM) or selective laser melting (SLM).

Selective laser melting is preferably used. The diameter of the powder particles 1 ranges from 1 μm to 50 μm. The powder is preferably monodisperse. The characteristics of a powder whose mean particle diameter is 30 μm are, for example, $d_{50}$=30 μm, $d_{10}$=10 μm and $d_{90}$=50 μm. The particle diameters may be measured using a laser granulometer.

Machines associated with the SLM method generally comprise a powder delivery system, a device for spreading and homogenising the surface of the powder (a 'roller" or a 'blade'), an infra-red laser source (for example with a wavelength of about 1060 nm), a scanner for directional control of the beam and a manufacturing zone. The entire assembly is confined within a thermally insulated enclosure not only to ensure control over the atmosphere but also to prevent dissemination of the powders.

According to another embodiment the method includes the following successive steps:

a2) Supply of a powder comprising particles 1 as defined earlier, b2) Projection of the powder onto a substrate, where the powder passes through a laser beam before reaching the substrate, so that it is melted, c2) Solidification of the molten powder on the substrate so as to create a first solidified zone.

Steps b2) and c2) are preferably repeated at least once so as to form at least one other solidified zone on the first solidified zone.

When the powder is projected, for example through a nozzle, in the direction of the substrate, it passes through a laser beam which causes it to melt. It then continues on its path in molten form until it reaches the substrate. The powder is projected locally onto the substrate so as to form the desired pattern.

This technique is a 3D printing technique using spraying of material, or Fused Deposition Modelling (FDM). The diameter of the powder particles 1 preferably ranges from 1 μm to 50 μm. The powder is preferably monodisperse.

The part obtained, according to one of the methods, may undergo an annealing step (heat treatment) to reduce internal stresses and to ensure that the properties of the material are uniform.

The thermal efficiency of conversion is improved using the embodiments of the method of the invention. It is not necessary to have high-power lasers and/or multiple beams to be able to generate a molten pool. Manufacturing costs are reduced and the yield of the method is improved. A decrease in material defects is also observed (in particular spheroidisation and splashing effects of a portion of the molten powder as a result of surface tension effects observed when the laser power is too great; this phenomenon is also known as 'balling').

The method may be used to form pure copper or alloys of type Al 2xxx, Al 6xxx or Al 7xxx, which are of interest in the aerospace field.

The method may also be used to make composite materials with a metallic matrix (for example with a titanium matrix) or to make parts made of ferrous alloys, titanium-based alloys, cobalt-chromium alloys, nickel alloys etc.

Such a method meets industrial needs by improving yields, the quality of the parts and increasing the number of alloys available.

ILLUSTRATIVE NON-RESTRICTIVE EXAMPLES OF DIFFERENT EMBODIMENTS

In the various examples the parts have been formed using SLM. The thickness of the powder beds deposited range from a few micrometres to several hundred micrometres, for example from 10 μm to 100 μm. The powder bed is locally swept by a laser beam moving at a speed of 100 to 1000 cm/s. The diameter of the laser spot is 70 μm. The power of the laser ranges from 300 W to 400 W.

Formation of an AlSi10Mg0.2 Alloy From a Particle Core Made of AlSi7Mg0.2

In this first example an AlSi10Mg0.2 alloy is made. In order to do this, particles of diameter 50 μm are covered with a continuous layer of silicon and with an external nanostructure layer of carbon nanotubes. The continuous layer and the external nanostructure layer have an overall thickness of 500 μm. The silicon coating represents 3% by mass of the mass of the final particle. A part is made from these particles using SLM. The alloy of the final part is AlSi10Mg0.2.

Formation of a 2024 Aluminium Alloy From a Particle Core Made of Aluminium

In this example it is decided to form a 2024 aluminium alloy. The particles of the invention are made from particles of pure aluminium. The aluminium particles have a diameter of 20 μm. They have a reflectivity of 35% at 1064 nm. The aluminium core is successively covered with:
  a continuous layer of manganese with a thickness of 12 nm, where the percentage mass of the manganese ranges from 0.3% to 0.9% relative to the final mass of initial 2024 aluminium,
  a continuous layer of magnesium with a thickness of 97 nm, where the percentage mass of magnesium ranges from 1% to 1.8% relative to the mass of the core of 2024 aluminium,
  a continuous layer of copper with a thickness of 25 nm,
  a layer of copper nanoparticles with a thickness of 25 nm.

Figure 6:
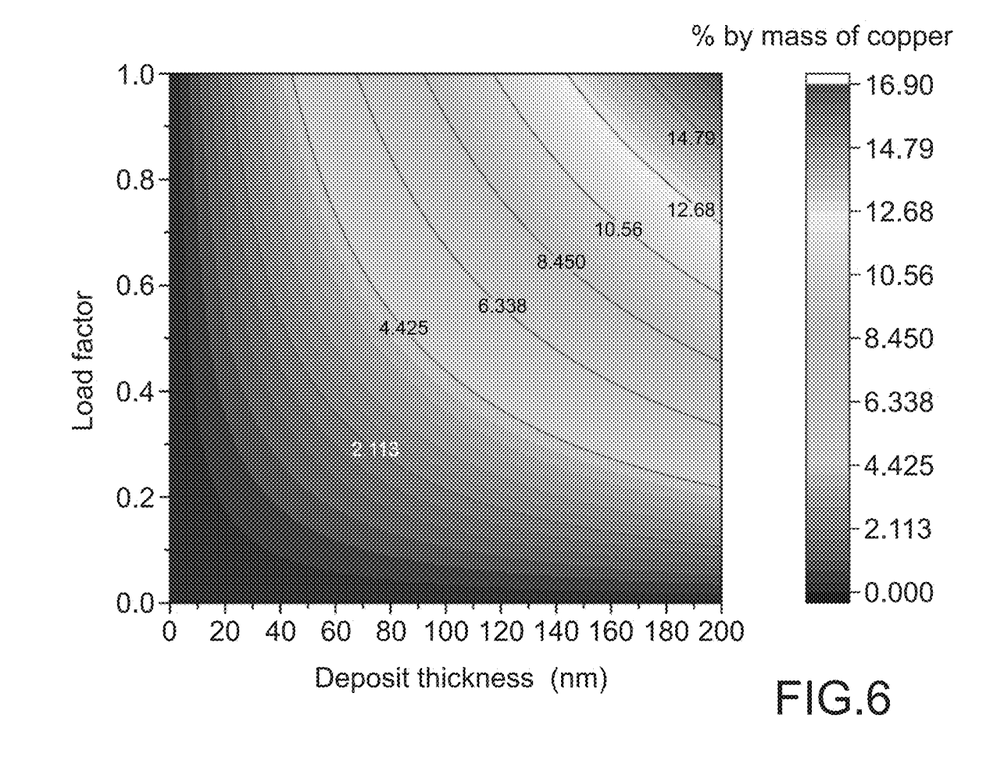
FIG. 6 shows the variation in the percentage by mass of copper in an aluminium powder as a function of the load factor and of the thickness of the deposit.

FIG. 6 shows the variation in the percentage mass of copper as a function of the load factor and of the thickness of the deposit. The load factor is the proportion of material relative to air (i.e. it represents the inverse of the 'porosity' of the deposit). For example, a load factor of 1 corresponds to a dense layer of copper.

The final particles obtained have an increase in absorption of from 10% to 20% relative to the aluminium core. Once molten the particles form an Al2024 alloy.

Formation of a 6061 Aluminium Alloy From a Particle Core Made of 6060 Aluminium

Figure 7:
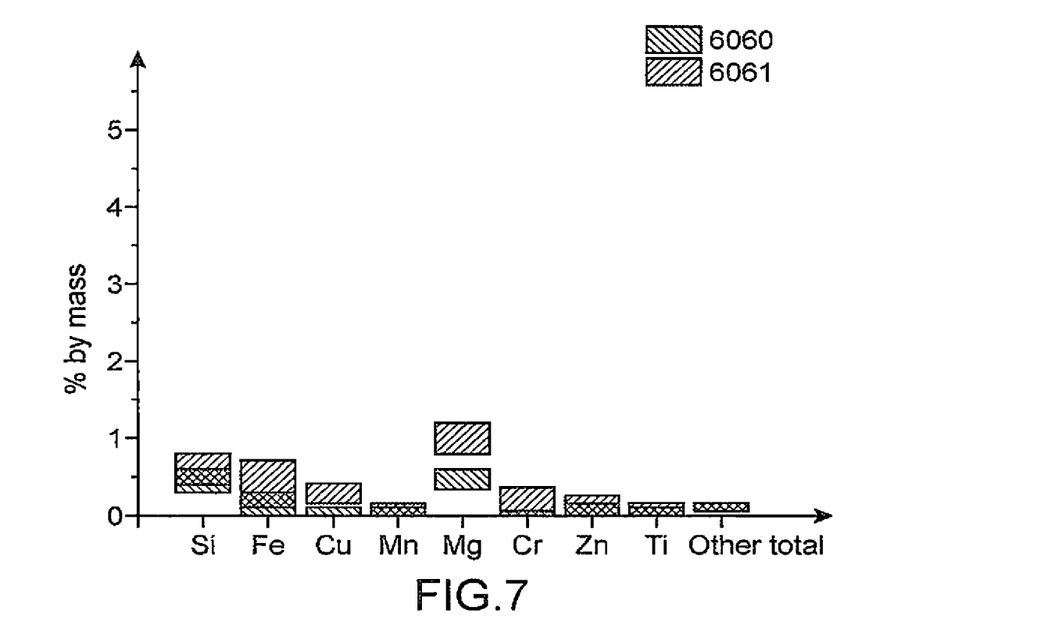
FIG. 7 shows the percentage by mass of the various elements making up the alloys Al 6060 and Al 6061.

In this example it is wanted to form a 6061 aluminium alloy from a particle core made of 6060 aluminium. FIG. 7 shows the difference in compositions between the Al6061 and Al6060 alloys. This shows that if copper and magnesium are added to the Al6060 alloy, Al6061 alloy can be obtained. The core of Al6060 particles is therefore successively covered by a continuous layer of magnesium and then by a continuous layer of copper and finally by a layer of copper nanoparticles which have a diameter ranging from 40 to 70 nm.

Formation of a 2024 Aluminium Alloy From a Particle Core Made of 2117 Aluminium

Figure 8:
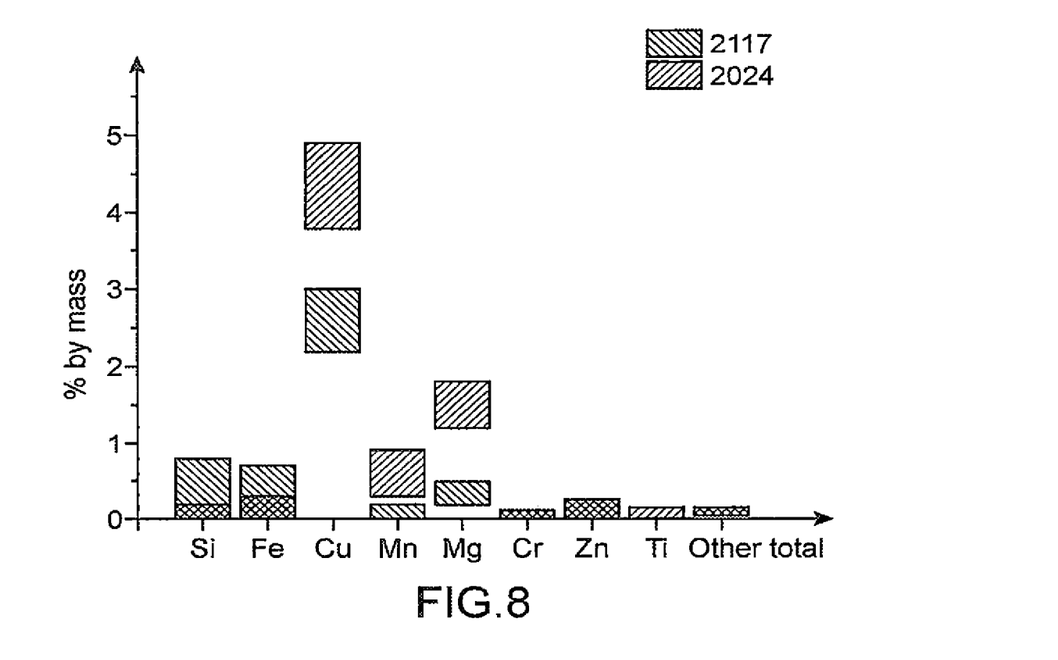
FIG. 8 shows the percentage by mass of the various elements making up the alloys Al 2117 and Al 2024.

To form a 2024 aluminium alloy, the starting point is a particle core made of 2117 aluminium. From the composition of the various alloys, it can be seen that by adding manganese, copper and magnesium to Al2117 alloy, Al2024 alloy can be obtained (FIG. 8). Thus a core of particles made of Al2117 is successively covered with:
  a continuous layer of manganese, of thickness 10 nm, which represents an addition of 0.7% in relation to the mass of the final material,
  a continuous layer of magnesium, of thickness 74 nm, which represents an addition of 1.3% in relation to the mass of the final material,
  a continuous layer of copper with a thickness of 10 nm,
  a layer of copper nanoparticles which have a diameter of about 20 nm.

The final particles obtained have an increase in absorption of from 10% to 20% relative to the 2117 aluminium core.

The invention claimed is:

1. A particle comprising a core made of aluminium or of an aluminium alloy, covered successively with: a stack of one or more metallic layers, the stack comprising at least one continuous layer completely covering the core of the particle, wherein the at least one continuous layer is made of manganese and/or magnesium; and an external layer formed from metal nanoparticles or carbon nanotubes;
   wherein the particle is in the form of a powder for 3D printing.

2. The particle according to claim 1, wherein the nanoparticles are made of copper.

3. The particle according to claim 1, wherein the nanoparticles have a diameter which ranges from 1 nm to 500 nm.

4. The particle according to claim 1, wherein the core of the particle has a diameter which ranges from 1 μm to 150 μm.

5. The particle according to claim 1, wherein the metallic layer or layers are each made of one metal chosen, independently, from gold, platinum, silver, manganese, magnesium, zirconium, zinc, silicon, nickel or copper.

6. The particle according to claim 1, wherein the external layer and the layer of the stack which is in contact with the external layer are made of copper.

7. The particle according to claim 1, wherein the at least one continuous layer further comprises copper, nickel, tin, or chromium.

8. The particle according to claim 1, wherein the at least one continuous layer further comprises zirconium, zinc, silicon, or nickel.

9. The particle according to claim 1, wherein the at least one continuous layer of the stack further comprises copper.

10. The particle according to claim 1, wherein the core of the particle is made of aluminium, the core being covered by a stack comprising a layer made of manganese, a layer made of magnesium and a layer made of copper, and by an external layer of copper nanoparticles.

11. The particle according to claim 1, wherein the external layer is formed from metal nanoparticles.

12. A method for manufacturing a metal part by 3D printing comprising at least the following successive steps:
   a1) supplying a powder comprising particles as defined in claim 1,
   b1) forming a bed of particles on a substrate,
   c1) localised melting of the powder bed so as to form a first molten zone, and solidification of the first molten zone of particles so as to form a first solidified zone.

13. The method according to claim 12, wherein the steps b1) and c1) are repeated at least once so as to form at least one other solidified zone on the first solidified zone.

14. The method according to claim 12, wherein the core of the particles is made of aluminium, with the core being covered by a stack comprising a layer made of manganese, a layer made of magnesium and a layer made of copper, and by an external layer of copper nanoparticles, and in that the solidified layer is a 2024 aluminium alloy.

15. The method according to claim 12, wherein the core of the particles is made of 6060 aluminium, with the core being covered by a stack comprising a layer made of magnesium and a layer made of copper, and by an external layer of copper nanoparticles, and in that the solidified layer is a 6061 aluminium alloy.

16. The method according to claim 12, wherein the core of the particles is made of 2117 aluminium, with the core being covered by a stack comprising a layer made of manganese, a layer made of magnesium and a layer made of copper, and by an external layer of copper nanoparticles, and in that the solidified layer is a 2024 aluminium alloy.

17. The method for manufacturing a metal part by 3D printing comprising at least the following successive steps:
   a2) supplying a powder comprising particles as defined in claim 1,
   b2) projecting the powder onto a substrate, where the powder passes through a laser beam before reaching the substrate, so that it is melted,
   c2) solidifying the molten powder on the substrate so as to create a first solidified zone.

18. The method according to claim 17, wherein the steps b2) and c2) are repeated at least once so as to form at least one other solidified zone on the first solidified zone.

19. The method according to claim 17, wherein the core of the particles is made of aluminium, with the core being covered by a stack comprising a layer made of manganese, a layer made of magnesium and a layer made of copper, and by an external layer of copper nanoparticles, and in that the solidified layer is a 2024 aluminium alloy.

20. The method according to claim 17, wherein the core of the particles is made of 6060 aluminium, with the core being covered by a stack comprising a layer made of magnesium and a layer made of copper, and by an external layer of copper nanoparticles, and in that the solidified layer is a 6061 aluminium alloy.

21. The method according to claim 17, wherein the core of the particles is made of 2117 aluminium, with the core being covered by a stack comprising a layer made of manganese, a layer made of magnesium and a layer made of copper, and by an external layer of copper nanoparticles, and in that the solidified layer is a 2024 aluminium alloy.

* * * * *